July 22, 1952   H. F. JOHNSTONE ET AL   2,604,185
METHOD AND APPARATUS FOR TREATING GASES
Filed Nov. 8, 1946   2 SHEETS—SHEET 2
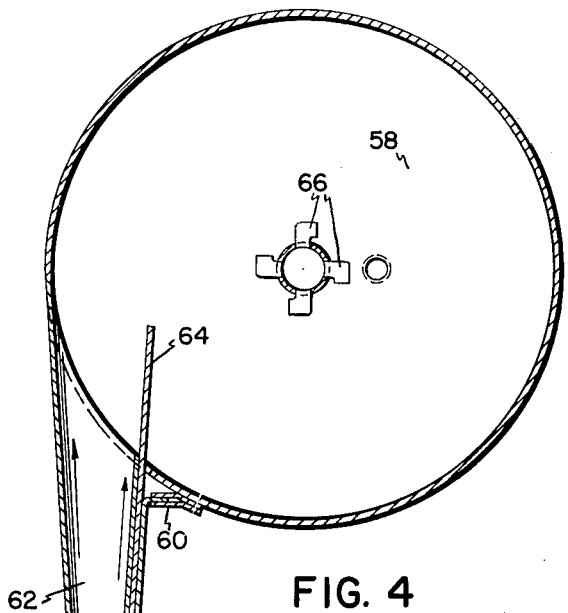
FIG. 4
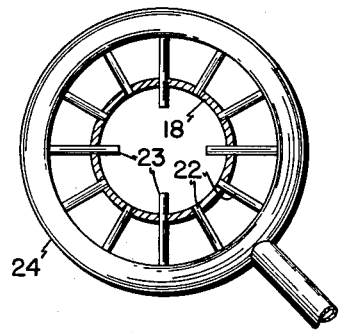
FIG. 6
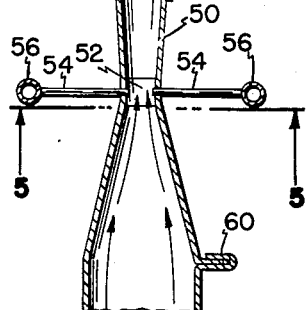
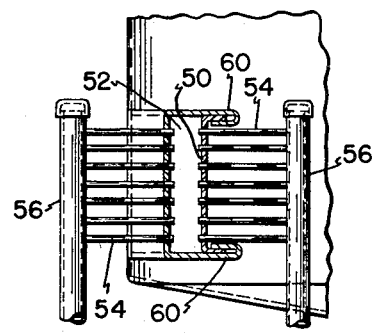
FIG. 5
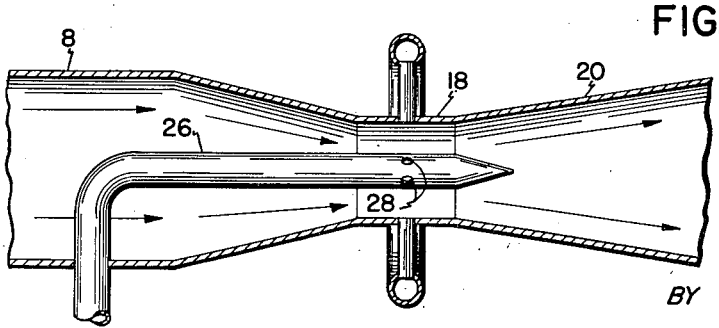
FIG. 7
INVENTORS
HENRY F. JOHNSTONE
ALFRED W. ANTHONY JR.
BY Jenney & Hildreth
ATTORNEYS Patented July 22, 1952

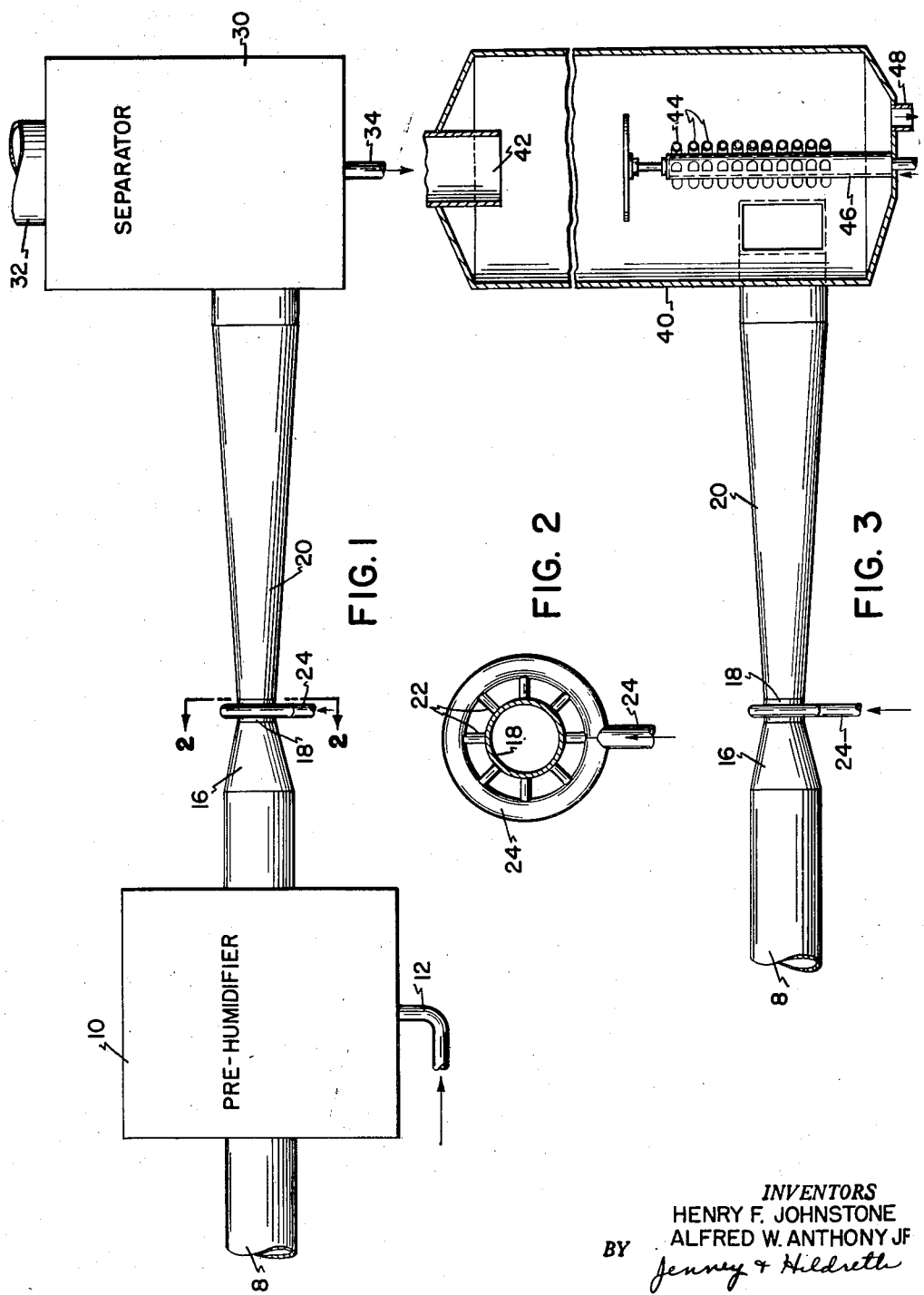

2,604,185

UNITED STATES PATENT OFFICE 2,604,185

METHOD AND APPARATUS FOR TREATING GASES

Henry F. Johnstone, Urbana, Ill., and Alfred W. Anthony, Jr., Waltham, Mass., assignors to Pease, Anthony Equipment Company, Waltham, Mass., a corporation of Massachusetts Application November 8, 1946, Serial No. 708,746

9 Claims. (Cl. 183—22)

The present invention relates to a method and apparatus for treating gases to effect the removal of finely divided suspended matter therefrom.

The removal of fine dusts and the elimination of noxious smokes from the gases discharged by industrial processes has long been a formidable problem. Waste gases frequently are found to contain vast quantities of extremely fine particles of solids or droplets of condensed liquid, which particles or droplets, in suspension, result in objectionable smokes, mists, fumes and fogs. In many cases, there is considerable economic loss as a result of the inability to recover the suspended matter.

Numerous attempts have been made to devise effective techniques for the interception and removal of fine suspended matter from gases. Frequently these have involved the use of liquid sprays, relying on the initial momentum of the spray discharge to bring about free-flight collision of the liquid droplets with the dust particles. For fine droplets, however, the ratio of droplet mass to cross-sectional area is so unfavorable that the initial momentum of the droplets is relatively ineffective to carry the droplets through the gas and into collision with the particles of suspended matter.

A method that has proved successful in minimizing this difficulty is that disclosed in U. S. patent to Pease No. 1,992,762 of February 26, 1935. According to that patent, a multitude of fine liquid droplets is introduced into the central region of a spinning gas stream. These droplets, the majority of which are preferably so fine as to be relatively ineffective by reason of their own initial momentum, are nevertheless caused to move through the gas stream as a result of centrifugal force developed by the gas spin. In their traversal of the gas stream, the droplets collide with and sweep the particles of suspended matter to the walls of the chamber, where they may readily be collected and removed.

While such method has proved successful for particle sizes larger than about one micron in diameter, its effectiveness falls off as the particle size becomes smaller. The difficulty in collecting dust and other suspended matter in sizes below about one micron is two-fold. On the one hand, if the interception of small particles by collision with liquid droplets is to be effective, the relative sizes of particles and droplets must not be too disproportionate. In general, it is considered that only droplets less than about one hundred to two hundred times the diameter of the dust particles are effective in intercepting and removing the particles. Since many smokes, fogs and fumes contain vast numbers of particles or droplets smaller than one or two microns, it is evident that for the treatment of gases containing these substances, the droplets of washing liquid should be predominately of size well below about 100 microns in diameter.

On the other hand, it is not enough merely to provide spray droplets of the desired fineness and size distribution, since the efficiency of collection of dust particles in the path of a liquid droplet is also a function of the relative velocity of the droplet. As the droplet size is decreased below about 25 to 50 microns, it becomes increasingly difficult to provide adequate relative velocity between the droplets and the gas containing the suspended matter, since the velocity of a droplet in a constant field of centrifugal force is approximately proportional to the square of the diameter of the droplet. As a result, even under conditions of gas spin that provide an acceleration many times that of gravity, the relative velocity of droplets under about 25 to 50 microns may be only a few feet per second, far too low for efficient collection of fine dusts and fumes by collision.

To make possible, therefore, the effective cleaning of gases containing such finely divided matter as smokes, fogs, and fumes, the present invention contemplates an improved method of contacting a gas with a washing liquid, whereby substantial motion is caused to take place between the gas and the liquid, and at the same time a very large total surface area of washing liquid is made available for gas-liquid contact.

According to a feature of the invention, the gases to be cleaned of suspended matter are accelerated to a relatively high linear velocity, and the washing liquid introduced into the high velocity gas stream, the high velocity of the gas being utilized not only to cause the suspended matter to impinge upon and be trapped by the washing liquid, but also to cause the break up of the liquid into a multitude of fine droplets having an extremely large effective surface area for particle interception. More specifically, the invention involves directing the gases to be cleaned through a passage that includes a Venturi throat to cause the gases temporarily to be accelerated to a high linear velocity, and introducing the washing liquid into the Venturi throat in a manner which causes the washing liquid to be distributed in finely divided form throughout the stream cross-section in the region of highest gas velocity. By reason of the high relative velocities developed between the gas stream and the washing liquid, particularly during droplet generation and acceleration, conditions are extremely favorable for interception of the suspended dust, fog or fume particles by the washing liquid. Following deceleration of the gases within the expansion section of the venturi, the gas and washing liquid may be directed through separating means, such as centrifugal separating apparatus, to remove the washing liquid and collected foreign matter from the gas stream.

Other objects and features will become apparent from the following description and the accompanying drawings, in which Fig. 1 is a view, partly in diagrammatic fashion, of a system for treating gases in accordance with the invention; Fig. 2 is a detail view in the vicinity of the Venturi throat thereof; Fig. 3 is a view partly in section of one form of apparatus well suited to carrying out the method of the invention, Fig. 4 is a sectional plan view in somewhat greater detail of apparatus embodying the invention; Fig. 5 is a detail in sectional elevation of the inlet passage of the apparatus of Fig. 4 adjacent the region of liquid introduction; Fig. 6 is a sectional detail of a Venturi throat, illustrating a nozzle arrangement suitable for relatively large venturis; and Fig. 7 is a sectional plan view of a venturi having an alternative nozzle arrangement.

In carrying out the invention, the gases to be treated are received through an inlet duct 8, under the influence of a fan or blower, not shown. Unless the gases are substantially in saturated condition, it may be advantageous in certain applications to provide humidification prior to actual treatment for removal of the suspended matter. Such humidification may be performed by any conventional unit indicated at 10, such as a spray chamber or the like to which humidifying liquid is supplied by pipe 12. Alternatively, the saturation of the gases may be effected without the use of a separate humidifying unit by supplying sufficient washing liquid as hereinafter described to provide both for saturation of the gases and removal of the suspended matter.

To effect the introduction of the washing liquid into the gas stream in the desired manner, the gases to be washed are directed through a duct in the form of a venturi, having a contraction section 16, a throat 18, and an expansion section 20. The contraction section, within which the gases are accelerated, may have a contraction angle of about 27°. The expansion section, on the other and, preferably has a considerably smaller angle, in order that the gas stream may be decelerated therein without undue loss of energy through excessive eddying and turbulence. In general, an expansion angle of the order of 7° will be found suitable, although angles differing slightly from this value may be employed, taking into account such factors as the effect of the introduction of washing liquid in changing the gas volume by cooling.

The washing liquid is introduced into the gas stream in the vicinity of the Venturi throat by means of a plurality of small nozzles 22 extending through the walls of the duct. For the smaller throat sizes, the nozzles may terminate flush with the inner walls of the duct, as shown in Fig. 2, while the larger throats may require that some of the nozzles extend into the gas stream, as at 23 in Fig. 6, in order to provide a substantially uniform distribution of liquid throughout the stream cross-section within the high-velocity region. The nozzles are connected to a manifold 24 supplied with washing liquid from a suitable source, not illustrated. Where the suspended matter would tend to erode exposed nozzles, an axially directed pipe 26 (Fig. 7) or pipes may extend from a region of relatively lower gas velocity into the Venturi throat to provide supplementary discharges through radial apertures or orifices 28. Preferably these apertures will be oriented to provide outwardly directed discharges intermediate the inwardly directed discharges from the wall orifices, so as to render substantially uniform the distribution of finely divided washing liquid within the throat region.

The effectiveness of the method of the present invention in cleaning a gas of very fine suspended matter is believed due, at least in large part, to the action of the high velocity gas stream in causing the suspended matter carried thereby to impinge on the washing liquid during its introduction into and acceleration by the gas stream. Whether the nozzles be plain, open-ended tubes or of the pressure-atomizing type, the initial relative velocity between the gas and the liquid is substantially that of the linear velocity of the gas. Since it is possible, by reason of the pressure recovery occurring during the deceleration of the gases within the expansion section of the venturi, to accelerate the gas stream temporarily to a relatively high velocity within the throat without undue pressure loss, gas velocities in excess of about two hundred feet per second may readily be provided, and such velocities are desirable in practicing the invention. Attainment of the requisite gas velocity is provided by suitably correlating the cross-sectional area of the Venturi throat with the volume of gas to be treated per unit time.

At relative velocities of this order, stable droplets can exist only in extremely small sizes. The action of the high velocity gas stream is therefore not only to break-up the entering liquid by shearing action as the liquid jets emerge from the nozzle orifices, but also to divide and subdivide the liquid films, filaments and droplets until size equilibrium is reached for the relative velocity then prevailing for each individual droplet. During the period of liquid break-up and acceleration of the droplets, extensive opportunity for impingement of the fast-moving suspended matter with the washing liquid is afforded. Not only is the relative velocity high, but a very large effective area of washing liquid is provided by reason of the very fine break-up or atomization which occurs.

In general, it has been found that highly satisfactory collection efficiencies may be obtained, in accordance with the method of the invention, by correlating the gas and liquid rates and the throat velocity to provide a total effective surface of washing liquid of the order of ten to twenty square feet for each cubic foot of gas treated. The figure for total effective surface is given by $$S \text{ (in square feet per cubic foot of gas)} = \frac{245L}{D_0} \quad (1)$$

where L is the liquid rate, in gallons of washing liquid per 1000 cu. ft. of gas, and $D_0$ is the mean voulme/surface diameter, being the diameter in microns of that droplet having the same ratio of volume to surface area as the total area of all the droplets bears to the total volume of washing liquid.

The value of $D_0$ is found from the approximate relationship $$D_0 = \frac{16050}{V_2} + 1.41 \, (L)^{1.5} \quad (2)$$

$V_2$ being the gas velocity in feet per second in the Venturi throat. For gas velocities and liquid rates with which the present invention is primarily concerned, $D_0$ will generally have a value below about 100 microns.

In addition to the impingement of the suspended matter within the gas stream on the washing liquid, it is believed that other phenomena may occur that contribute to the cleaning of the gases. Thus, even after the droplets of washing liquid have been accelerated to the approximate velocity of the gas stream, the turbulent conditions inherent in the gas flow and enhanced by the introduction of the washing liquid continue to provide substantial relative motion between the liquid droplets and the gases. Due to the extremely large area of the liquid surfaces, and due also to the high relative velocities between gas and liquid, there is likewise opportunity for particle interception, particularly of the very fine sizes, as a result of molecular diffusion. It is possible that static electricity charges induced by the friction of the high velocity gas flow past the liquid films may likewise aid in capture of the suspended matter by the liquid droplets. A further possibility is that due to the sudden cooling brought about by the introduction of the washing liquid and the rapid expansion of the gases within the venturi, condensation may occur with the particles of suspended matter as nuclei.

As the deceleration of the gas proceeds in the expansion section of the venturi, the droplets of washing liquid with occluded matter tend to coalesce and therefore to separate from the gas. The result is that a considerable portion of the washing liquid introduced into the throat appears as liquid that may be drained from the bottom of the venturi at the discharge end, along with the intercepted suspended matter. The gas stream will, however, contain fine droplets in suspension that must be removed in order thoroughly to carry out the cleaning operation. To this end, the expansion section of the venturi may be connected to separating means indicated diagrammatically at 30, having an outlet for the cleaned gas at 32 and a drain for the liquid and occluded matter at 34.

The separating means may be of any conventional type that is effective to remove entrained liquid droplets from a gas stream. Apparatus employing centrifugal force to effect the separation, such as the cyclone and the baffle type, is suitable. The effect of centrifugal force is to cause the droplets to move transversely of the gas flow toward the boundary of the gas stream where they may be collected and withdrawn along with the intercepted matter. While it is believed that a very substantial proportion of the suspended matter is intercepted by the droplets within the venturi, due to the effectiveness of the sweeping action provided by the extensive relative motion of gas and droplets, nevertheless the possibility of intercepting any remaining suspended matter during the separation of the droplets from the gas must not be overlooked in considering the type of separator to be employed.

In certain instances, therefore, it may prove advantageous to make use of separating apparatus operating in the general manner of the above-mentioned Pease Patent No. 1,992,762. Such apparatus not only permits highly effective sweeping of the fine droplets and occluded matter from the gas, but it may aid in providing a supplemental washing action for any suspended matter that may not have been intercepted in the venturi region. As shown in Fig. 3, the venturi may be arranged to discharge tangentially into the cylindrical shell 40 of the separator, so as to cause the mixture of gas and liquid droplets to spin while traversing the chamber to the outlet 42. As a result of the centrifugal force developed by the gas spin, the fine liquid droplets are carried across the gas stream, the relative motion providing additional opportunity for interception of any suspended matter by the droplets.

If for any reason a further sweeping or washing action is required, supplemental sprays may be provided within the separator chamber. Thus, a plurality of spray nozzles 44 may be mounted on a central manifold 46 to permit the discharge of fine sprays of washing liquid into the spinning gas stream. The droplets produced by these sprays will aid in sweeping the very fine droplets and occluded matter to the walls of the chamber. A drain 48 permits removal of the washing liquid and entrained matter.

In the event supplemental sprays are employed in the separator chamber, the washing liquids used in the venturi and in the separator may be the same or of different composition. While in general water, or an aqueous solution if the washing liquid is recirculated, will be employed, there may be occasions where it will be advantageous to employ a non-aqueous liquid in one or the other or both regions of the apparatus. Thus, in the fluidized catalyst cracking of petroleum, liquid oil may be introduced into gases containing the dust catalyst, when the process subsequently requires mixture of the dust with the oil in the gas phase. On the other hand, for certain applications it may prove desirable to employ in the venturi a liquid that is a solvent for the suspended matter in the gas stream, and then sweep the droplets of solution from the stream in the separator chamber, employing the supplemental sprays where advantageous to do so. For other types of suspended matter, the particle or fume interception may be enhanced by including a wetting agent in the washing liquid introduced into the Venturi throat.

Where substantial cooling of the gas is required in addition to cleaning, as is the case in the treatment of blast furnace gases, for example, the separating means indicated diagrammatically at 30 may comprise a counter-current cooling tower or like apparatus commonly employed for substantially cooling a gas. Such apparatus not only serves effectively to remove the fine droplets from the gas stream, but also provides very substantial cooling by reason of the counter-current flow of cooling water generally employed in such a tower or column. The use of a counter-current tower or column following the cleaning within the venturi likewise permits the effective recovery of waste heat from the gases, for paper mill installations and the like.

For some installations, it may be desirable to provide for adjustment of the Venturi characteristics in order to permit efficient operation of the equipment at various rates of gas supply. To meet these requirements, apparatus resembling that shown in Fig. 4 may be provided. In this embodiment the venturi is rectangular in section, having one wall 50 movable toward and away from the opposite wall so as to vary the area of the throat 52 and hence the gas velocity therethrough. Liquid is introduced through tubes or nozzles 54 from a manifold 56. Overlapping sliding joints 60 minimize gas leakage between the adjustable and the fixed walls of the venturi.

In order to control the velocity of gas spin within the separator chamber 58, the amount of pressure recovery in the expansion section 62 of the venturi may be made adjustable. A sliding wall section 64 may be extended or withdrawn to change the effective length of the expansion section, and hence control the gas velocity at entrance to the scrubber shell. By varying the liquid rates to the Venturi nozzles and to the spray nozzles 66 within the separator, and by adjusting the venturi to provide suitable gas velocities for liquid atomization at the throat and spin within the separator chamber, efficient cleaning of the gases may be provided over a relatively wide range of gas supply rates.

An example of the collection efficiencies made possible by the method of the invention is the recovery of sodium sulphate and carbonate fume from the chemical recovery gases of kraft paper mills. In a typical instance, these fumes have been found by electron microscope photographs to be not over about 1.5 micron in diameter, with about 70% of the weight below about 1.0 micron, from 15 to 25% below about 0.5 micron, and with very high particle counts below 0.1 micron. Dust loadings have been found to be 1 to 2 grains per cubic foot of gas, and higher. Typical runs in a pilot plant treating about 2500 cubic feet of such fume-laden gas per minute, representing approximately 5% of the whole gas flow from a 150 ton per day kraft recovery plant, have shown collection efficiencies of 90% and even higher, with liquid rates at the Venturi nozzles of from 4.5 to 7 gallons per 1000 cubic feet of gas. On the basis of relationships (1) and (2) above, $D_0$, the mean volume/surface diameter or characteristic droplet size figures out to between 50 and 80 microns, and the total effective surface area of washing liquid falls in the approximate range of 10 to 20 square feet of droplet surface per cubic foot of gas. Since it has been possible, heretofore, to collect such fine material with any effectiveness only by electrostatic means, it is apparent that the present method represents a marked advance in the art of washing gases with a liquid.

It will be understood that the embodiments shown and described are for purposes of illustration and that the invention comprehends other arrangements and modifications within the scope of the appended claims. Furthermore, it will be appreciated that the invention, in addition to its practicability for the separation of dust and other finely-divided matter including fine liquid droplets, is highly effective for the separation and removal of gases soluble in the washing liquid independently of whether or not the gas or air in process of treatment contains additional finely-divided solid or liquid matter to be removed.

We claim as our invention:

1. Apparatus for washing gases comprising a venturi having a throat section for accelerating the gas to be treated, a plurality of nozzles adjacent the throat section having discharge passages directed substantially transversely of the direction of gas flow through the throat for introducing jets of washing liquid into the high velocity gas stream to cause the stream to break up the liquid jets into fine liquid droplets in the gas, and separating means for treating the mixture of gas and droplets to remove the droplets from the gas stream, said separating means having means for spinning the gas stream and a plurality of spray nozzles for introducing a spray of washing liquid into the spinning gas stream to cause the spray droplets to sweep the fine droplets and collected matter from the gases.

2. Apparatus for washing gases comprising a venturi having a contraction section, a throat section, and an expansion section, means for introducing a plurality of jets of washing liquid into the throat section substantially transversely of the direction of gas flow through the throat to effect the generation of fine liquid droplets in the gas stream, means for adjusting the venturi to vary the cross-sectional area of the throat thereof to control the gas velocity therethrough, and separating means for removing the liquid droplets and collected matter from the gas stream.

3. Apparatus for washing gases comprising a venturi having a contraction section, a throat, and an expansion section, means for introducing washing liquid into the throat region of the venturi to generate fine liquid droplets in the gas stream, centrifugal separating means for removing the liquid droplets and collected matter from the gas, said separating means having a tangential inlet coupled to the expansion section of the venturi, means for adjusting the cross-sectional area of the Venturi throat to control the gas velocity therethrough, and means for adjusting the effective length of the expansion section of the venturi to control the gas velocity at the inlet to the separating means.

4. Apparatus for washing gases comprising a venturi having a contraction section, a throat, and an expansion section, a plurality of nozzles arranged around the throat for discharging jets of washing liquid into the gas stream substantially transversely of the direction of gas flow, liquid supply means extending into the throat from a region of relatively larger cross-sectional area, said means having radially directed apertures for the discharge of jets of washing liquid outwardly from said means into the gas stream and in a direction substantially transverse to the direction of gas flow within said throat, and means connected to the expansion section of the venturi for separating the liquid from the gas.

5. Apparatus for washing gases to remove finely divided matter therefrom, comprising a Venturi passage within which the gas is accelerated, and means for introducing washing liquid into the accelerated gas stream within the passage comprising a plurality of nozzles having discharge apertures for discharging solid jets of washing liquid in spaced relation over the stream cross-section and transversely of and in penetrating relation to the moving gas stream whereby the gas stream impinges on said jets at a relative velocity substantially that of the velocity of the accelerated gas stream within the Venturi passage to disrupt the jets of liquid in turbulent extended-surface contact between the liquid and the gas.

6. Apparatus for washing gases to remove finely divided matter therefrom, comprising a Venturi passage within which the gas is accelerated, and means for introducing washing liquid into the accelerated gas stream within the passage comprising a plurality of nozzles disposed in spaced relation around the Venturi passage, said nozzles having discharge apertures for discharging solid jets of washing liquid inwardly of and substantially normal to the walls of said passage in penetrating relation to the accelerated gas streams to cause the said gas stream to impinge on said jets at a relative velocity substantially that of the accelerated stream within the passage and thereby disrupt the liquid jets in turbulent extended-surface contact between the liquid and the gas.

7. Apparatus for washing gases to remove finely divided matter therefrom, comprising a Venturi passage within which the gas is accelerated, and means for introducing washing liquid into the accelerated gas stream within the passage comprising a plurality of nozzles disposed in spaced relation around the Venturi passage, said nozzles having plain discharge apertures for discharging solid jets of washing liquid inwardly of and substantially normal to the walls of the passage, other nozzles within the passage and having their discharge passages directed outwardly toward the walls of the passage, the outwardly directed nozzles being disposed in substantially the plane of the inwardly directed nozzles to provide a distributed pattern of jets of washing liquid over the stream cross-section within the passage, and means for supplying washing liquid to said nozzles to cause the jets to penetrate the accelerated gas stream and cause the gas to impinge on the jets at a relative velocity substantially that of the accelerated stream within the passage and thereby disrupt the liquid jets in turbulent extended-surface contact between the liquid and the gas.

8. The method of washing gases to remove finely divided matter therefrom which comprises directing the gas to be treated through a treating passage while accelerating the gas, introducing into the accelerated gas stream within the treating passage and in spaced relation over the stream cross-section a plurality of discrete solid jets of washing liquid, said jets of washing liquid being directed transversely of the gas stream to penetrate the stream and cause the accelerated gas and suspended matter to impinge on and disrupt the liquid jets in turbulent extended-surface contact between the gas and the liquid, and thereafter separating the suspended droplets from the gas.

9. The method of washing gases to remove finely divided matter therefrom which comprises directing the gas to be treated through a treating passage while accelerating the gas, continuously maintaining within the accelerated gas stream and in spaced relation over the stream cross-section within the treating passage discrete masses of washing liquid, said masses of washing liquid being introduced transversely of the gas stream to penetrate the stream and cause the accelerated gas and suspended matter to impinge on and disrupt the liquid masses in turbulent extended-surface contact between the gas and the liquid, and thereafter separating the suspended droplets from the gas.

HENRY F. JOHNSTONE.
ALFRED W. ANTHONY, Jr.

REFERENCES CITED

The following references are of record in the file of this patent:

UNITED STATES PATENTS

| Number | Name | Date |
|---|---|---|
| 723,531 | Jackson | Mar. 24, 1903 |
| 1,324,236 | Ehrhart | Dec. 9, 1919 |
| 1,734,677 | Kreisinger | Nov. 5, 1929 |
| 1,819,595 | Dauphinee | Aug. 18, 1931 |
| 1,965,866 | Tolman, Jr. | July 10, 1934 |
| 2,119,478 | Whiton, Jr. | May 31, 1938 |
| 2,200,891 | Nyborg | May 14, 1940 |
| 2,361,150 | Petroe | Oct. 24, 1944 |

FOREIGN PATENTS

| Number | Country | Date |
|---|---|---|
| 349,233 | Great Britain | May 28, 1931 |
| 243,605 | Germany | Feb. 17, 1912 |